(12) United States Patent
Lee

(10) Patent No.: US 6,308,963 B1
(45) Date of Patent: Oct. 30, 2001

(54) LEVELLING VALVE ACTUATING APPARATUS

(75) Inventor: Gi-Ho Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/467,484

(22) Filed: Dec. 20, 1999

(30) Foreign Application Priority Data

Oct. 8, 1999 (KR) .................................. 99-43382

(51) Int. Cl.$^7$ .................................. B60G 17/00
(52) U.S. Cl. .................. 280/5.514; 280/6.15; 280/6.157; 280/6.159; 280/124.1; 280/124.16
(58) Field of Search .................. 280/5.5, 5.514, 280/5.515, 6.15, 6.151, 6.157, 6.158, 6.159, 124.1, 124.101, 124.102, 124.157, 124.158, 124.159, 124.16, 124.161, FOR 100, FOR 145, FOR 159, FOR 165, FOR 161, FOR 168, FOR 171

(56) References Cited

U.S. PATENT DOCUMENTS 3,659,870 * 5/1972 Okuyama .
3,858,902 * 1/1975 Howells et al. .

* cited by examiner

*Primary Examiner*—Eric Culbreth
(74) *Attorney, Agent, or Firm*—Birch, Stewart, Kolasch & Birch, LLP

(57) ABSTRACT

A levelling valve actuating apparatus is provided for converting a linear displacement resulting from a vehicular height change into a rotational displacement and controlling operation of a levelling valve, the apparatus positioned between a wheel-side suspension and the levelling valve, the valve being supplied with operating air from an air source and the air supply to an air spring adjusted by means of actuation of a rotary plate for intermittently interrupting a hydraulic fluid passage within the valve body, comprising a lever for adjusting vehicle height one end of which is connected to the rotating plate of the levelling valve outside of the valve body, a connecting slot being formed at an opposite end of the lever in a longitudinal direction, a rack being formed on the inside of the connecting slot along the longitudinal direction; a rod for adjusting vehicular height having an arcuate external shape, an end of the rod being mounted on a side of the suspension through a ball joint, an arcuate slot being formed along a central portion of the rod; and a variable connection means for adjusting connection positions between the rod and the lever depending upon road conditions, wherein the connection passes through the connecting slot and the arcuate slot.

3 Claims, 5 Drawing Sheets

LEVELLING VALVE ACTUATING APPARATUS

BACKGROUND OF THE INVENTION

1. Field of the Invention

The present invention relates to a levelling valve actuating apparatus for use in air suspension of a vehicle, particularly to a levelling valve actuating apparatus which is constructed between a levelling valve body and the suspension and is controlled by means of vehicular height displacement varied depending upon road conditions.

2. Description of the Prior Art

In general, an air spring used in air suspension system supports weight of the vehicles, absorbs vibration and shock resulting from the road, and reduces or attenuates irregular vibration transmitted from road wheel by means of air cushion. Thus, safe and comfortable driving is accomplished.

Such an air spring is connected to an air tank through a levelling valve. Compressed air within the air tank is introduced into the air spring through an intake port of the levelling valve or is discharged through the exhaust port of the valve.

As shown in FIG. 6, the conventional levelling valve is constructed in a manner that a rotating plate (not shown) for switching hydraulic fluid passage inside the valve body 51 is connected to one end of a lever 52 for adjusting vehicular height located outside the valve body 51, the other end of the lever 52 is disposed in a perpendicular direction to the rotating plate and hinged to an end of a rod 53 for adjusting vehicular height, and the other end of the rod 53 is connected to the suspension member 54 through a ball joint 55.

The rod 53 and the lever 52 change a vertical displacement into an angular displacement in response to vehicular height of the front/rear wheel-side varied on vehicle weight change, drive the rotating plate (not shown) within the levelling valve 56 to rotate, and control the opening/closing of intake/exhaust ports. Thus, the levelling valve 56 is actuated to maintain stable vehicular height by supplying or discharging the compressed air into or from the front/rear air springs.

However, as mentioned above, the lengths of the rod and the lever used as an apparatus for actuating the levelling valve are determined to be constant. Thus, in the case that the road condition is extremely poor and maximum displacement of the vehicular height has occurred, there is a problem that the rotating plate in the levelling valve moves beyond its rotational region, and consequently the levelling valve is erroneously actuated.

Further, another problem is that the levelling valve which may variably adjust the response of air springs depending upon the road condition cannot obtain the desired levelling due to the constant length of the rod and the lever.

SUMMARY OF THE INVENTION

Accordingly, the present invention was implemented to solve the above problems.

The object of the present invention is to provide an improved levelling valve actuating apparatus which not only prevents erroneous actuation of the levelling valve but also improves the response characteristics of air springs depending upon road conditions, and thus improves vehicular stability and comfortability by variably changing connection positions between the rod and the lever of the levelling valve in response to the vehicular height depending road conditions.

To accomplish the above object, the present invention provides a levelling valve actuating apparatus for converting a linear displacement resulting from a vehicular height change into a rotational displacement and controlling operation of the the levelling valve. The apparatus is constructed to be disposed beween wheel-side suspension and the levelling valve. The valve is supplied with operating air from an air tank and adjusts the air supply to an air spring by means of actuation of a rotary plate for intermittently interrupting a hydraulic fluid passage disposed within a valve body. The apparatus further comprises a lever for adjusting vehicular height of which an end is connected to the rotating plate of the levelling valve outside the valve body, a connecting hole being formed at another end of the lever in a longitudinal direction, a rack being formed on an inner portion of the connecting hole along the longitudinal direction; a rod for adjusting vehicular height having an arcuate external shape, an end of the rod being mounted to a side of the suspension through a ball joint, a slot of similar arcuate shape being formed at a central portion of the rod; and a variable connection means for adjusting connection positions between the rod and the lever depending upon road conditions, the means being mounted such that it can pass through the connecting hole and the slot.

The variable connection means further comprises a stepping motor which can be reversibly driven in accordance with road conditions; a pinion which is mounted at a rotational shaft of the motor and is engaged with the rack disposed at a side of the connecting hole and thus generates a horizontal displacement in response to the actuation of the stepping motor; and a magnetic clutch which is integrally formed to be mounted with a rear portion of the motor through the slot of the rod.

Furthermore, it is characterized in that the magnetic clutch is constructed to include first and second clutch plates between which the rod is disposed, and an operating shaft is connected at one side to an operating portion of the clutch and is mounted at the other side to the second clutch plate with the shaft penetrating the first clutch plate and extending through the slot of the rod.

BRIEF DESCRIPTION OF THE DRAWINGS

The present invention is explained further in detail by referring to the accompanying figures.

PREFERRED EMBODIMENTS OF THE INVENTION

Figure 1:
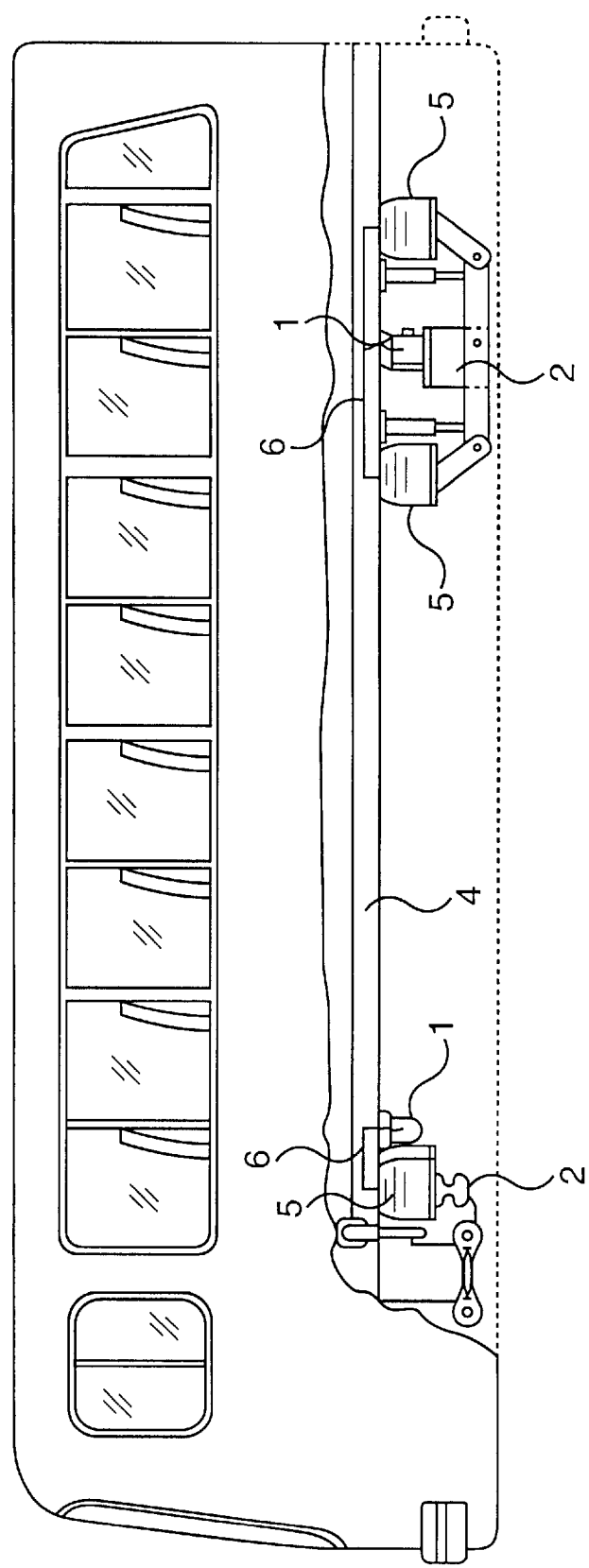
FIG. 1 is a partial sectional view of a vehicle in which a levelling valve actuating apparatus according to the present invention is applied.

FIG. 1 is a partial sectional view of a vehicle to which a levelling valve actuating apparatus of the present invention is applied. The levelling valve 5 is constructed to be disposed between front/rear axles 2 and a vehicular body 4, and is connected to both air springs (not shown) and air tubes 6.

Figure 2:
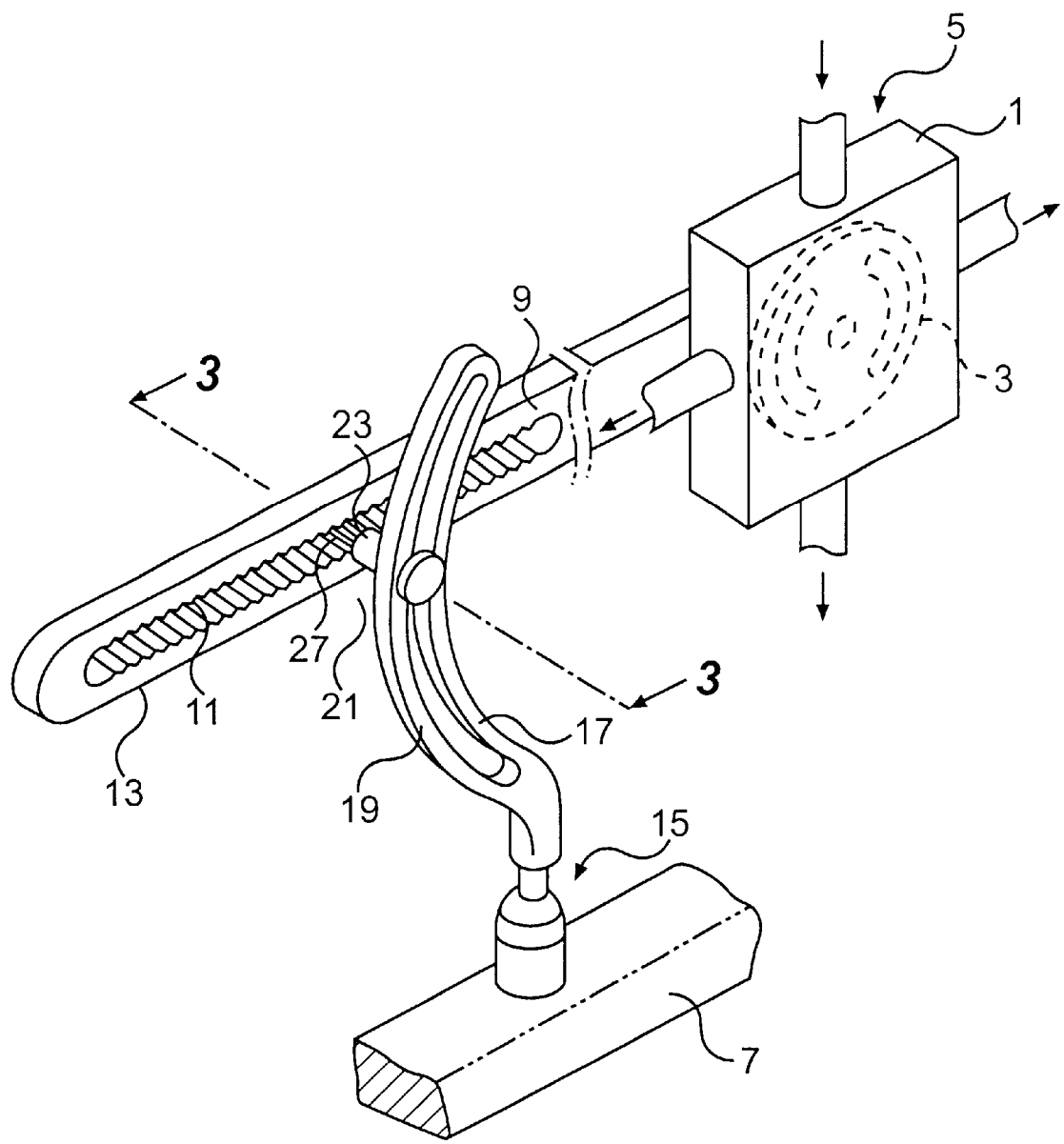
FIG. 2 is a perspective view of the levelling valve actuating apparatus according to the present invention.

As shown in FIG. 2, the levelling valve actuating apparatus for actuating such a levelling valve 5 is constructed between the valve 5 and the wheel-side suspension 7. The valve 5 is supplied with operating air from air tanks (not shown) and controls the air supply by actuation of a rotating plate 3 which intermittently interrupts a pneumatic fluid passage disposed in the valve body 1. Thus the apparatus controls actuation of the valve 5 by converting a linear.

The levelling valve actuating apparatus essentially includes a lever 9 for adjusting vehicular height, a rod 17 for adjusting vehicular height, and variable connection means 21 for movably connecting the lever 9 and the rod 17. An end of the lever 9 is connected to the rotating plate 3 of the valve 5 outside the valve body 1. A connecting hole 11 is formed in another end of the lever 9 in a longitudinal direction. A rack 13 is formed on a side of the hole 11 along the longitudinal direction.

An end of the rod 17 is mounted to a side of the suspension 7 through a ball joint 15. The rod 17 is formed as an arcuate external shape. Further, a slot 19 of an arcuate shape similar to the rod shape is formed within the central portion.

In order to variably connect the lever 9 and the rod 17 through the hole 11 and the slot 19, the variable connection means 21 is constructed to be disposed therebetween.

Figure 3:
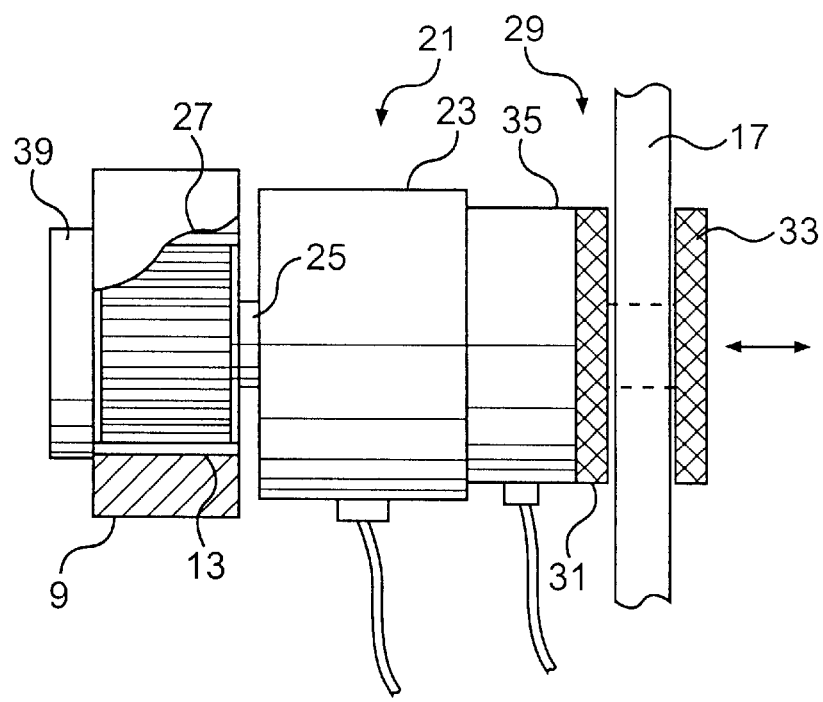
FIG. 3 is a partial sectional view cut along a line A—A in FIG. 2.
Figure 4:
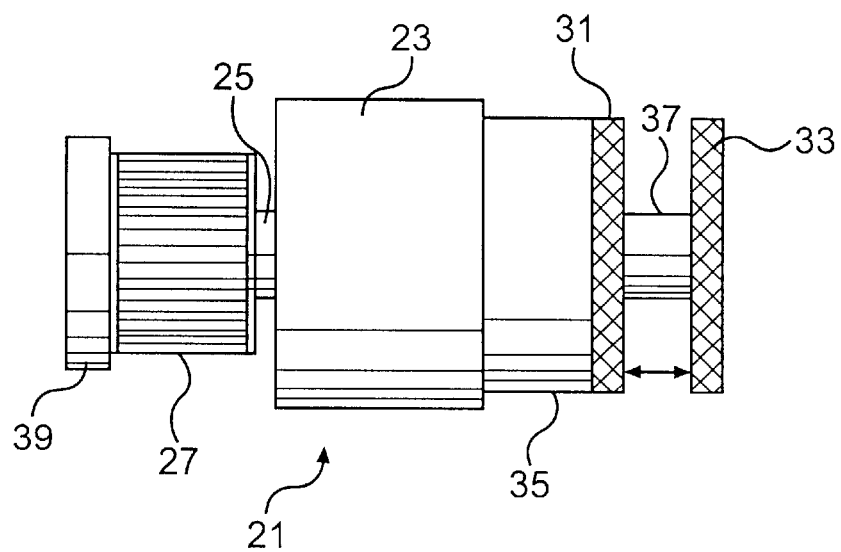
FIG. 4 is a front view of a variable connection means for use in the levelling valve actuating apparatus according to the present invention.

As shown in FIGS. 3 and 4, the variable connection means 21 includes a stepping motor 23, a pinion 27 attached to an end of the motor 23 via a drive shaft 25, and a magnetic clutch 29 attached to another end of the motor 23. The pinion 27 is mounted to the shaft 25 of the stepping motor 23 which operates in accordance with control signals in response to road conditions. Further the pinion 27 is meshingly engaged with rack 13 formed on the side of the connecting hole 11 of the lever 9, and generates a horizontal displacement of the lever 9 in accordance with the operation of the stepping motor 23.

In addition, a stop plate 39 is formed on the external side of the pinion 27 in the longitudinal direction in order to prevent the pinion 27 from breaking away from the connecting hole 11.

Furthermore, the magnetic clutch 29 includes first and second clutch plates 31, 33. The magnetic clutch 29 is integrally constructed at the rear portions of the stepping motor 23. The clutch plates 31, 33 are disposed with the rod 17 interposed therebetween. A drive shaft 37 is connected to magnetic clutch drive portion (not shown) disposed within a casing of the clutch 29. The magnetic clutch 29 is also constructed such that the drive shaft 37 extends to penetrate into the first plate 31 through the slot 19 of the rod 17 and is coupled to the second plate 33.

Figure 5:
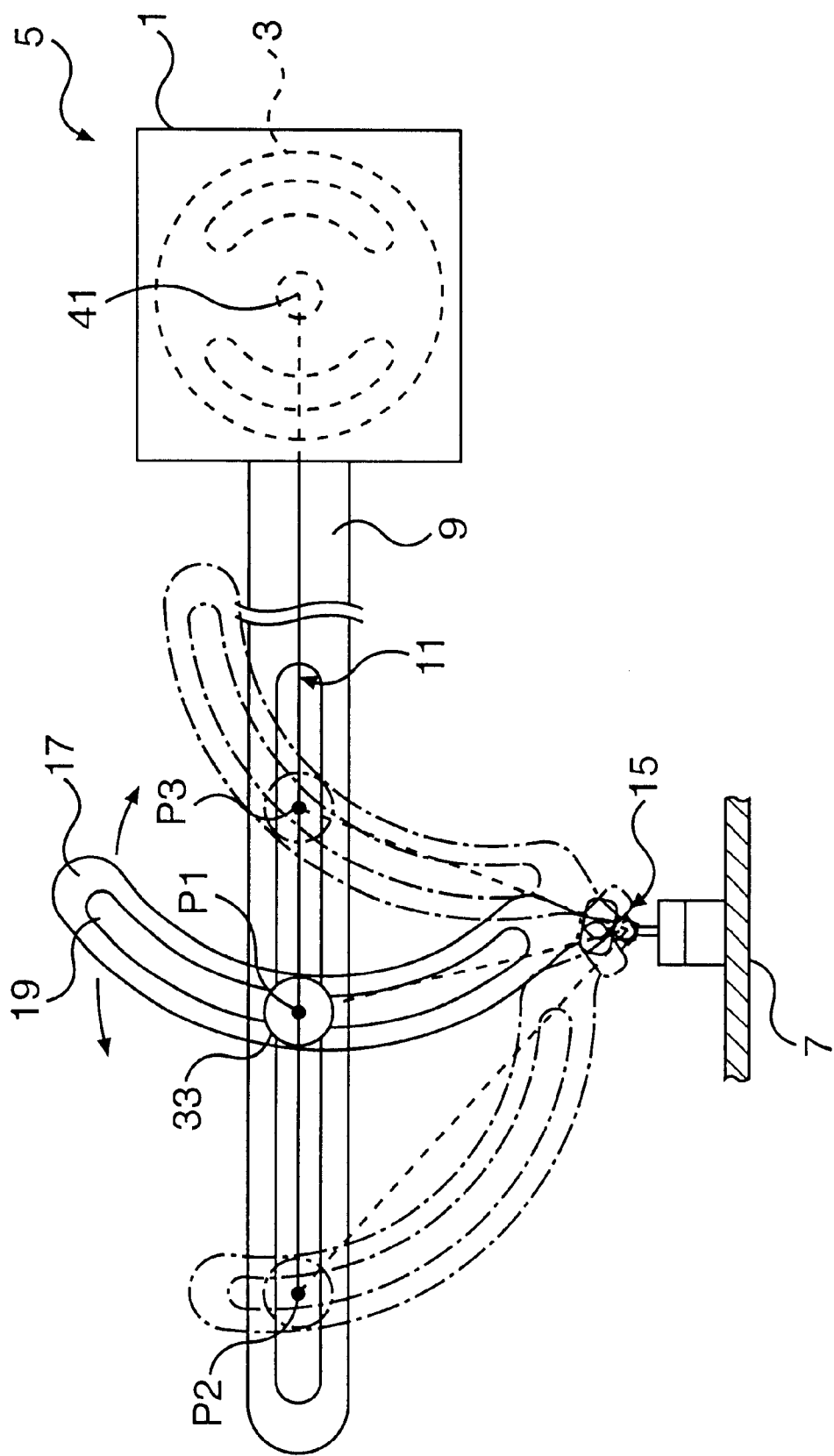
FIG. 5 is a view of explaining the operation of the levelling valve actuating apparatus according to the present invention.
Figure 6:
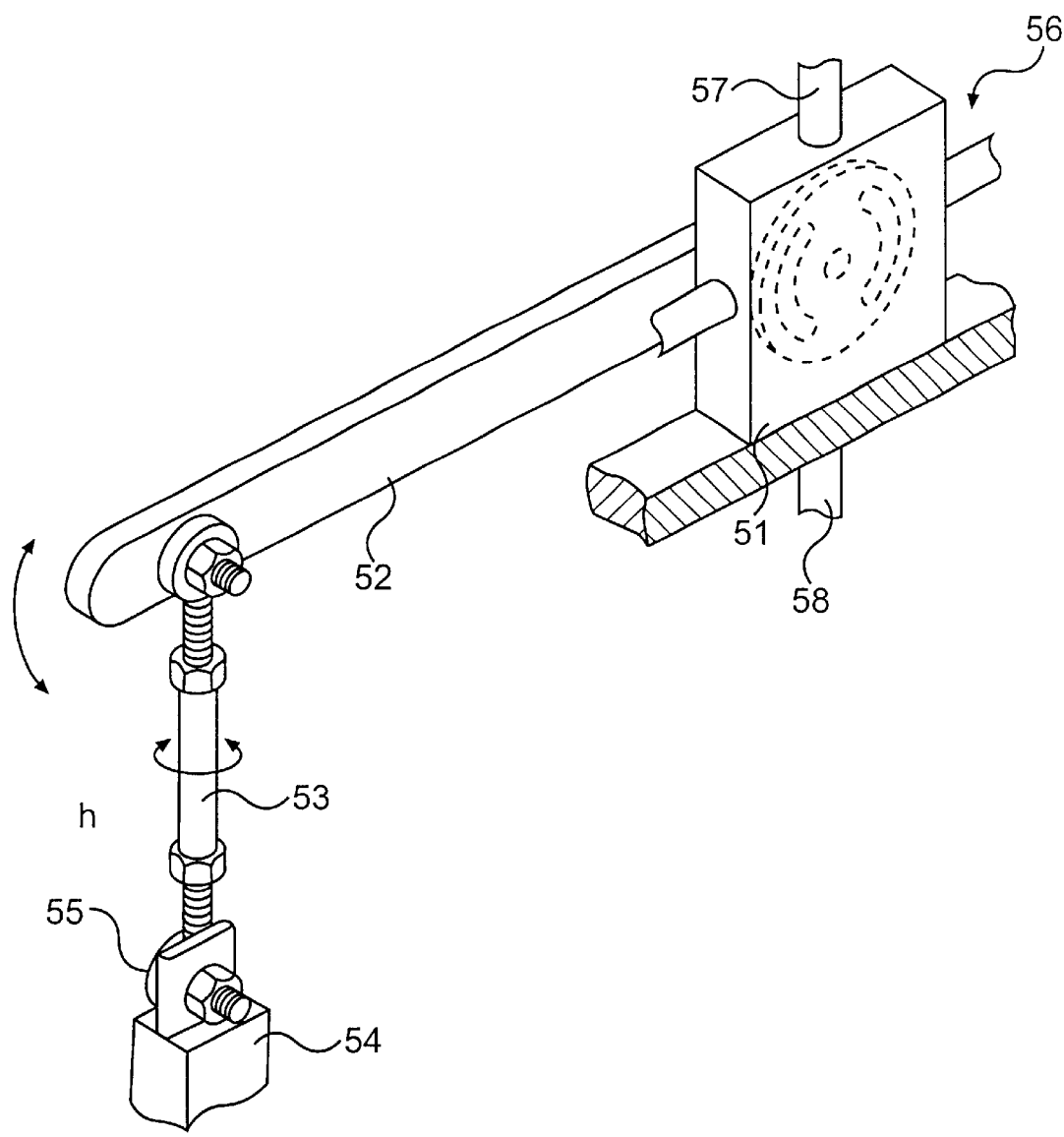
FIG. 6 is a perspective view of the levelling valve actuating apparatus according to the prior art.

Next, the operation of the levelling valve actuating apparatus according to the present invention having the above construction will be described with reference to FIG. 5.

Firstly, when a vehicle is travelling on a generally flat road, connection state of the lever 9 and the rod 17 is maintained to an initial position P1 by means of the variable connection means 21. Thus, the vehicular height displacement is perpendicularly transmitted from the road to the lever 9 through the rod 17.

And then, the levelling valve 5 supplies or discharges operating air to or from the air spring (not shown) in response to the initially determined vehicular height displacement. Thus, the response characteristics of the air springs (not shown) are determined.

Further, when a vehicle is travelling on unpaved road having a rough road condition, the operation of the magnetic clutch 29 is released and the engagement of the variable connection means 21 with the rod 17 is also loosened. Thus, the connection means 21 is able to move along the slot 19 of the rod 17.

Simultaneously, the stepping motor 23 rotates forward and the pinion 27 also moves forward on the rack 13 of the lever 9. At this time, the displacement of the magnetic clutch 29, which is integrally connected to the stepping motor 23, on the rod 17 is released by its movement along the slot 19.

Consequently, forward operation of the stepping motor 23 and movement of the magnetic clutch 29 are completed at the forward position P2. After that, the operation of the magnetic clutch 29 resumes and the variable connection means 21 is fixed again to the rod 17.

If due to the operation of the variable connection means 21, the rod 17 and the lever 9 are connected to each other in a state that their lengths are larger, the rotational displacement transmitted from the lever 9 with respect to a rotational axis passing through a central point 41 of the rotating plate 3 in the valve body 1 is not largely changed even though the linear displacement of the rod in response to the vehicular height displacement resulting from the rough road is largely varied. As a result, the levelling valve 5 is not nearly actuated. Thus, the actuation of the air spring (not shown) in response to the vertical vibration of the suspension 7 is made insensitively, and stable drivability is accomplished.

In addition, when a vehicle is travelling on a smooth road that generates small vibration only, the operation of the magnetic clutch 29 is again released and the engagement of the variable connection means 21 with the rod 17 is also loosened. Thus, the connection means 21 is able to move along the slot 19 of the rod 17.

Simultaneously, the stepping motor 23 rotates rearward and the pinion 27 also moves rearward on the rack 13 of the lever 9. At this time, the displacement of the magnetic clutch 29, which is integrally connected to the stepping motor 23, on the rod 17 is again released by its movement along the slot 19.

Consequently, the rearward operation of the stepping motor 23 and the movement of the magnetic clutch 29 are completed at the rearward position P3. After that, the operation of the magnetic clutch 29 resumes and the variable connection means 21 is fixed again to the rod 17.

If due to the above operation of the variable connection means 21, the rod 17 and the lever 9 are connected to each other in a state that their lengths are smaller, the rotational displacement transmitted from the lever 9 with respect to a rotational axis passing through a central point 41 of the rotating plate 3 in the valve body 1 is largely amplified even though the linear displacement of the rod in response to the vehicular height displacement resulting from the smooth road is transmitted in a small extent. As a result, the operation of the levelling valve 5 is largely affected. Thus, the actuation of the air spring (not shown) in response to the vertical vibration of the suspension 7 is made with sensitivity, and the response characteristics to the small vibration resulting from the smooth road are enhanced.

In the meantime, the lengths of the rod 17 and the lever 9 can be adjusted depending upon the road conditions by using the levelling valve actuating apparatus of the present invention. Thus, although maximum vehicular height displacement is occurred in case of poor road condition, lengths of the lever 9 and the rod 17 which correspond to the vehicular height displacement are suitably selected by the above variable change operation. Accordingly, there are advantageous effects of the present invention that the rotating plate 3 in the levelling valve 5 is not erroneously actuated such that it moves beyond the rotational regions.

As mentioned above, the levelling valve actuating apparatus of the present invention can change the connection positions between the rod and the lever in accordance with the vehicular height displacement depending upon the road conditions and adjust the length of the rod and the lever. Therefore, the rotational displacement transmitted from the lever to the rotating plate in the valve body can be stabilized and erroneous operation of the levelling valve can be prevented beforehand. Further, both stability and comfortability of the vehicle can be enhanced since the response characteristics of the air spring to the road conditions are enhanced.

What is claimed is:

1. A levelling valve actuating apparatus for converting a linear displacement resulting from a vehicular height change into a rotational displacement and controlling operation of a levelling valve, the apparatus positioned between a wheel-side suspension and the levelling valve, the valve being supplied with operating air from an air source and the air supply to an air spring adjusted by means of actuation of a rotary plate for intermittently interrupting a pneumatic fluid passage within a valve body, comprising:

a lever for adjusting vehicle height, one end of which is connected to said rotating plate outside of the valve body, a connecting slot being formed at an opposite end of the lever in a longitudinal direction, a rack being formed on the inside of the connecting slot along said longitudinal direction;

a rod for adjusting vehicular height having an arcuate external shape, an end of the rod being mounted on a side of the suspension through a ball joint, an arcuate slot being formed along a central portion of the rod; and a variable connection means for adjusting connection positions between the rod and the lever depending upon road conditions, said connection means passing through the connecting slot and the arcuate slot.

2. The apparatus according to claim 1, wherein the variable connection means comprises:

a stepping motor for being reversibly driven in response to control signals depending upon the road conditions;

a pinion for generating a horizontal displacement by means of stepping motor, the pinion being mounted to a rotating shaft of the motor and engaged with the rack; and a magnetic clutch integrally constructed to be mounted to a rear portion of the motor through the slot of the rod.

3. The apparatus according to claim 2, wherein the magnetic clutch comprises:

first and second clutch plates between which the rod is interposed, and a drive shaft which is connected to the second clutch plate with the drive shaft passing through the first clutch plate and the slot.

* * * * *